United States Patent [19]

Smith et al.

[11] Patent Number: 4,573,509
[45] Date of Patent: Mar. 4, 1986

[54] RUN FLAT DEVICE

[75] Inventors: William T. Smith; Timothy M. Rooney, both of Uniontown; George T. Watts, North Canton, all of Ohio

[73] Assignee: The Goodyear Tire & Rubber Company, Akron, Ohio

[21] Appl. No.: 646,475

[22] Filed: Aug. 31, 1984

Related U.S. Application Data

[63] Continuation of Ser. No. 507,836, Jun. 23, 1983, abandoned.

[51] Int. Cl.$^4$ .................................... B60C 17/06
[52] U.S. Cl. .................................... 152/158; 152/520; 152/409
[58] Field of Search ............... 152/158, 330 RF, 406, 152/409, 410

[56] References Cited

U.S. PATENT DOCUMENTS

| | | | |
|---|---|---|---|
| 2,380,649 | 7/1945 | Hollerith | 152/406 |
| 3,141,490 | 7/1964 | Lindley | 152/158 |
| 3,519,053 | 7/1970 | Lindley | 152/158 |
| 3,529,869 | 9/1970 | Casey | 152/409 |
| 3,682,218 | 8/1972 | Johannsen et al. | 152/158 |
| 3,777,797 | 12/1973 | Anderson | 152/158 |
| 3,777,798 | 12/1973 | Marquis | 152/158 |
| 3,882,919 | 5/1975 | Son, Jr. et al. | 152/410 |
| 4,163,466 | 8/1979 | Watts | 152/158 |
| 4,293,016 | 10/1981 | Bible et al. | 152/330 RF |
| 4,346,747 | 8/1982 | Osada et al. | 152/330 RF |
| 4,393,911 | 7/1983 | Winfield | 152/158 |

FOREIGN PATENT DOCUMENTS 2658049  7/1978  Fed. Rep. of Germany ...... 152/330 RF Primary Examiner—Lois E. Boland
Attorney, Agent, or Firm—L. R. Drayer

[57] ABSTRACT

An annular ring-shaped run flat device is used in tires to permit continued use of the tire even when the tire is operating at low pressure or is completely deflated. This device is comprised of a rigid section and a non-rigid section. The tire, when it collapses, due to a reduction in pressure, comes to rest on the surface of the non-rigid, resilient, impact resistant section. This device is easy to assemble, can be used with conventional multi-piece rims, is light weight, durable and capable of absorbing impact under both inflated and deflated conditions. The device can also be used as a positive and non-positive bead spacer to prevent dismounting of the tire beads when tire pressure drops.

5 Claims, 4 Drawing Figures

RUN FLAT DEVICE

This is a continuation of application Ser. No. 507,836 filed on June 23, 1983, now abandoned.

The foregoing abstract is not to be taken as limiting the invention of this application, and in order to understand the full nature and extent of the technical disclosure of this application, reference must be made to the accompanying drawings and the following detailed description.

BACKGROND OF THE INVENTION

The present invention relates to a new type of run flat device for pneumatic vehicle tires.

Various run flat devices exist for pneumatic vehicle tires. Their general purpose is to provide a surface on which the inner surface of the portion of the tire beneath the tread can rest when air is purposely or accidentally removed either totally or to a great degree such that the pneumatic tire collapses totally or partially. The tire then can be run on the vehicle for a period of time until the vehicle operator is able to replace it with another tire. Such deflations could occur on a passenger tire on a street or highway, on an off-the-road vehicle that would come in contact with sharp and abrasive objects, and military vehicles whose tires might be punctured by a bullet or shrapnel.

Many prior art devices have been inadequate because they were not strong enough to support a vehicle with a deflated tire or absorb impact when the tire was inflated, but came into contact with an irregular surface such as a chuck hole or a log, which would cause the inner surface of the tire, even though completely inflated, to come in contact with the run flat device. Other devices were not easy to assemble or required nonconventional rims.

There has therefore been a need for a highly durable, light weight, impact resistant, heat resistant run flat device which was easy to assemble and which could be used on conventional rims.

An object of an aspect of this invention is to provide a light weight, run flat device which can be used with conventional rims and is easy to assemble. An object of an aspect of this invention is to provide a durable run flat device which will absorb impact under inflated and uninflated conditions. An object of an aspect of this invention is to provide a run flat device which is relatively heat resistant. An object of an aspect of this invention is to provide a run flat device which is also a bead spacer.

In accordance with one aspect of this invention there is provided an annular ring shaped, run flat device comprising a radially outer ring which is non-rigid and flexible and a radially inner ring which is rigid. The outer ring provides the resilient load bearing surface while the inner ring is the load carrying member.

DETAILED DESCRIPTION OF THE INVENTION

In one embodiment of the present invention, the rigid non-flexible radially inner ring has a cross-section with an outer shape that can be rectangular or trapezoidal.

The radially inner ring is substantially hollow so as to contribute to the light weight of the device. While the radially inner ring is substantially hollow, it can contain radial reinforcements. These radial reinforcements should be used sparingly so as to keep the weight of the device to a minimum. To further reduce the weight of the device openings can be present in the top side and/or lateral sides and/or bottom side of the radially inner ring. The number and size of the openings are limited only by the structural strength requirements of the device, i.e., to absorb the impacts experienced by the device either while the tire is inflated or under reduced or zero pressure.

The hollow radially inner ring need not possess a bottom side. When it does not, it can be attached to the wheel rim through the bottom edges of its lateral sides, or radial reinforcements, if present, or in any other desired manner.

The resilient non-rigid radially outer ring also has a rectangular or trapezoidal cross-section. Its radially inner surface should be no wider than the radially outer surface of the rigid ring. Preferably it is the same width.

In one embodiment both the rigid and non-rigid rings have rectangular cross sections with the top side of the rigid portion being essestially the same width as the bottom side of the non-rigid portion. In another embodiment, both rings have trapezoidal cross sections with the wide bases being radially inward and the outer side of the rigid portion being essentially the same width as and centered on the inner side of the non-rigid portion.

The outer ring can rely solely on the inherent resiliency of the material of which it is comprised for its overall resiliency and flexibility. However, it can also rely on its shape to enhance its resiliency and flexibility, e.g., by openings within the body thereof or grooving in its radially outer surface.

For larger vehicles the radially outer surface of the non-rigid ring should contain less grooving and preferably no grooving at all. The non-rigid ring should also be of a lesser thickness for heavy vehicles. When used with lighter vehicles, the thickness and/or grooving can be increased, if desired.

The outer surface of the non-rigid portion should be relatively flat or slightly rounded to more uniformly distribute the load over the contact area.

Figure 2:
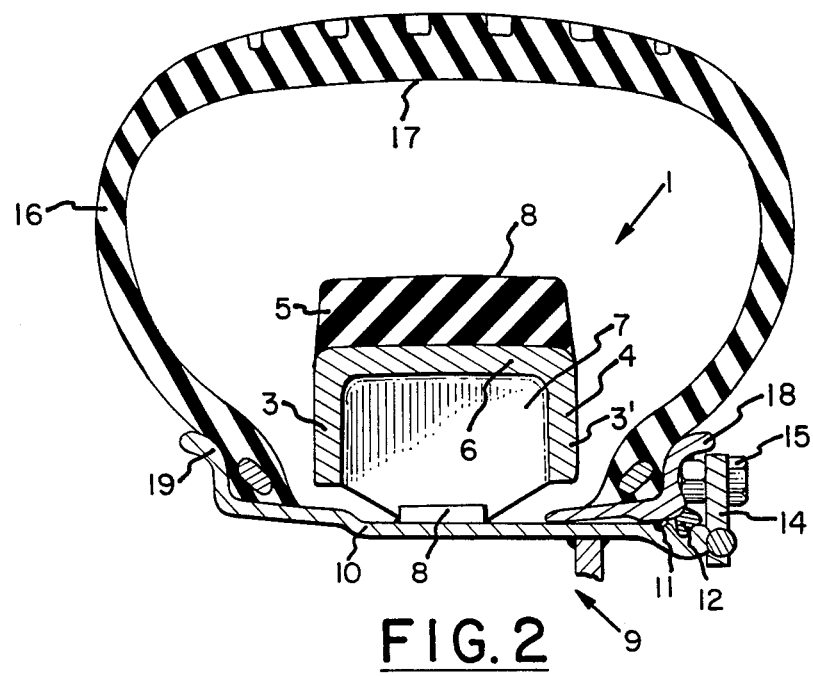
FIG. 2 is a cross sectional view of the device mounted on a three-piece rim.

In one embodiment, particularly where the device is used for a heavy vehicle, the radially outer ring has a rectangular cross section and a continuous, flat outer surface and the radially inner ring has a rectangular cross section and an opening therein which is essentially rectangular in shape. Preferably the inner ring has no bottom side. The radially inner ring would therefore have a squared U, i.e., squared horseshoe shape such as depicted in FIG. 2.

The use of a flexible, resilient component having the load bearing surface, with a rigid load carrying member beneath it, results in a satisfactory run flat device.

In one embodiment, the total section height of the run flat device from the rim base to the outer surface 8 of the resilient outer ring is 25 to 55 percent, preferably 30 to 45 percent of the total section height of the tire in which it is positioned, the section height of the tire being one-half times the difference between the outer diameter of the tire and the nominal rim diameter. The total section height of the run flat device varies according to the loading requirements of the vehicle and tire and the type of service. For example, the total section height of the run flat device should preferably be 30 to 45 percent of the tire section height for large all terrain military vehicles, most preferably 30 to 35 percent.

The rigid device may be made of any rigid material including metals. Examples of metals are steel, magnesium and aluminum. It can also be made from rigid plastics such as fiber reinforced composites. Magnesium and aluminum are particularly desirable because of their light weight. Plastic materials should be selected carefully with consideration being given to their high temperature properties, since heat build-up can occur during the use of this device. The top side and lateral sides of the rigid device as well as any supports can be and preferably are of a unit construction, but can be separate components.

The entire device itself must be in at least two parts so as to be capable of being placed inside the tire. In this respect see 2 and 2' in FIG. 1.

The non-rigid portion can be any material which will deflect upon impact but return to its original configuration when the impact is removed. Vulcanized elastomers are preferred materials, both natural and synthetic.

The bottom surface of the non-rigid outer ring and radially outer surface of the rigid inner ring can be positioned against one another in any conventional manner, for example by fasteners or conventional metal-to-rubber adhesives or by having interlocking surfaces, so long as the two rings are rendered incapable of relative movement in any direction to each other. Mere friction contact is sufficient if great enough to prevent any significant relative movement between the two surfaces.

Vulcanized elastomers which can be used in the non-rigid portion include conventional tread compounds. Elastomers which can be used include vulcanized polymers having a modulus of 5 to 16 (preferably 12 to 16) meganewtons, an elongation of 400 to 700 (preferably 400 to 500) percent, tensile of 14 to 30 (preferably 20 to 30) meganewtons, a Shore A hardness of 50 to 90 (preferably 60 to 70) and a resiliency, as measured by Goodyear Heally hot (100° C.) rebound, of at least 30 percent, preferably at least 60 percent and most preferably at least 70 percent. Modulus, elongation and tensile are measured by ASTM D 412. Shore A measurements are made according to ASTM D 2240. Goodyear Heally rebound is measured by ASTM D 1054.

Although not limited thereto, the following rubber composition can be used in the non-rigid portion after vulcanization thereof, for example for 25 minutes at 150° C.

| Ingredients | Parts by Weight |
|---|---|
| Natural Rubber | 100 |
| HAF Black | 50 |
| Processing Oil | 10 |
| Amorphous Silica | 20 |
| N—t-butyl-2-benzothiazylsulfenamide | 1.5 |
| Waxes | 1.0 |
| Antioxidant | 1.5 |
| Antiozonant | 1.5 |
| Zinc Oxide | 3 |
| Sulfur | 2 |

A conventional manner of mounting this multi-piece device into a tire is described as follows. One piece (for purposes of this illustration a two-piece device will be considered) is placed inside the tire with the non-rigid portion facing the inside surface of the tire beneath the tread. The second piece is placed within the tire and then adhered or fastened at each of its ends to each of the ends of the other half of the device.

This device is designed to be used only with a multi-piece rim, for example a two-piece rim that can simply be bolted together or a multi-piece rim using a removeable flange or flanges, an O ring and lock ring.

The run flat device is mounted in such a fashion that it preferably will not rotate circumferentially around the rim when the vehicle is in motion. It can either be permanently affixed or loosely affixed, for example, mounting a radial support between two stoppers which are permanently affixed to the surface of the rim. The latter positioning would permit only slight circumferential movement. While lateral movement would occur in the latter situation, this is normally not a problem.

Conventional lubricants or coolants normally used with other run flat devices, such as gels, should be used with the present device to lubricate the interface between the radially outer surface of the outer ring and the inner surface of the tire beneath the tread.

Figure 1:
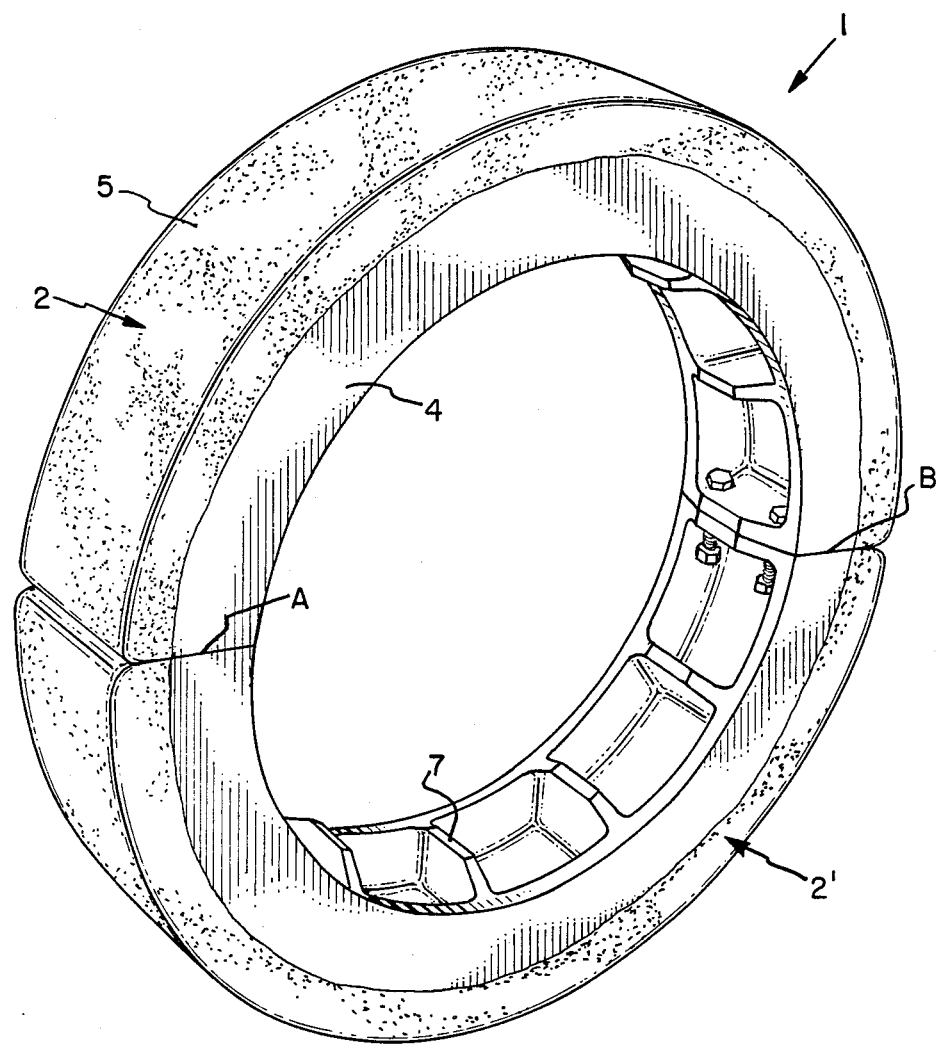
FIG. 1 is a perspective view of a two-piece device with both pieces fastened together.

FIG. 1 is a perspective view of a device 1 within the scope of the present invention. The two halves of the device, 2 and 2', are fastened at points A and B. The inner rigid ring 4 is surrounded by the non-rigid ring 5.

FIG. 2 illustrates, in cross-sectional view, the device 1 mounted within a tire 16 on a three-piece rim 9. The non-rigid portion 5 of the device is attached to the rigid portion 4 of the device at the topside of the rigid portion 4 by a conventional rubber/metal adhesive. The rigid portion of the device is comprised of two lateral sides 3,3' and a topside 6 which are integrally bound together as a unit construction. A radial support 7 is also illustrated. When the tire collapses, the outer surface 8 of the non-rigid portion of the device comes in contact with the inner surface 17 of the tire. It should be noted that this device is used only in tubeless pneumatic tires. The pneumatic tires, however, can be of either radial or bias construction or cast tires for any type of vehicle whether passenger, motorcycle, truck or off-the-road, including military vehicles.

Figure 3:
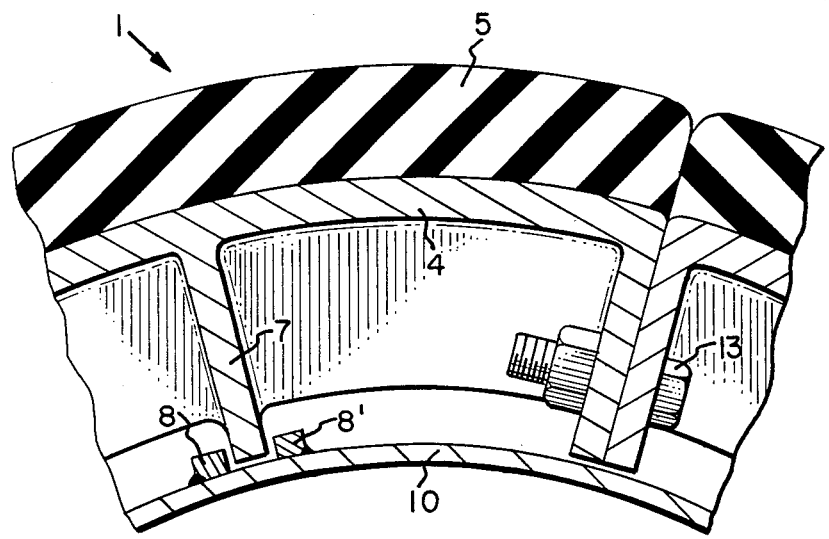
FIG. 3 is an enlarged side view of a portion of the device positioned on a rim inside a tire.
Figure 4:
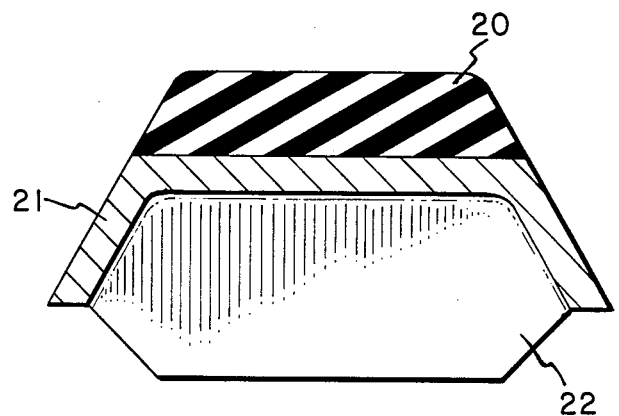
FIG. 4 is the cross sectional view of another embodiment of the device.

The rigid portion of the device is positioned on the base 10 of the three-piece rim 9, through the radial support, the lower edge of the radial support being positioned between two stops 8 and 8' (FIG. 3).

After the device is positioned inside the tire, the rim base 10 is inserted through the bead opening of the tire until its permanent flange 19 rests near the bead of the tire. The tire is then positioned to shift the device toward the permanent flange side so as to permit the moveable flange 18 to be positioned axially toward the center line to expose the groove in the base, in which the O-ring 11 is to be snapped. The O-ring 11 is then positioned and the lock ring 12 then placed in the outer groove of the base. By using a cap screw 15, the lock plate 14 is positioned against the outer part of the flange and the tire inflated.

The rigid portion 4 of the device can act as a non-positive bead spacer. Should the tire lose pressure and the beads tend to move away from the flange thereby creating the possibility of their demounting from the tire, it will first come in contact with one of the lateral sides of the rigid portion of the device thereby preventing the dismounting.

In one embodiment the height of the rigid section of the device is 20 to 80 percent of the height of the device.

The device can also be used as a positive or non-positive bead spacer with a 2-piece rim. With other multi-piece rims such as 3-piece and 5-piece rims, the device can be used as a non-positive bead spacer. As guidelines, but not limitations, the width of the run flat device near its base should be approximately 0.75 to 1.0 inch less than the rim width minus two times the tire bead width for 3-piece rims and should be approximately 1.5 to 2 inches less than the rim width minus two times the tire bead width for 5-piece rim assemblies.

This is necessary to permit the transverse positioning of the moveable flange 18, for example, for insertion of the O-ring 11 and lock ring 13.

FIG. 3 is an enlarged side view of a portion of a device within the scope of the present invention. The non-rigid section 5 is positioned on top of the rigid section 4. The rigid section 4 has a radial support 7 which is positioned between two stops 8,8' welded to the rim base 10. Two ends of the two halves of the device are shown as fastened by a cap screw 13.

When a rim having a moveable flange is used, the device should be designed to permit the moveable flange to move without interference from the device when the device and tire are being mounted and the rim assembled.

While fabric reinforcement can be used as reinforcement in the non-rigid portion of the device, e.g., to prevent growth due to centrifugal force, its use is not necessary.

In one embodiment of the present invention, the outer ring is a one-piece vulcanized elastomeric band which can be stretched around the outer perimeter of the multi-piece inner ring.

Absolute measurements of resiliency herein are measured by Goodyear Heally hot (100° C.) rebound (ASTM D 1054).

When the outer ring is comprised of vulcanized elastomer, it is preferably non-porous.

The inside diameter of the device is approximately equal to the nominal rim diameter of the rim on which it is to be mounted.

While certain representative embodiments and details have been shown for the purpose of illustrating the invention, it will be apparent to those skilled in this art that various changes and modifications may be made therein without departing from the spirit or scope of the invention.

What is claimed is:

1. An assembly of a multi-piece rim, a tire, and a run flat device comprising:
(a) a multi-piece rim comprising an annular rim base having a flange extending radially outwardly from one axial end and a pair of circumferentially extending grooves in said rim base near its other axial end, a movable flange slideably mounted around said rim base, an O-ring having a portion of its mass disposed within the axially innermost groove of said pair of circumferentially extending grooves in said rim base, said O-ring being compressedly secured in place between the rim base and the movable flange, and a lock ring having a portion of its mass disposed in the axially outermost groove of said pair of circumferentially extending grooves in said rim base, said lock ring having at least one surface that is contiguous with said movable flange;
(b) a tubeless pneumatic tire mounted upon said rim, said tire having a pair of bead portions with one bead portion disposed adjacent to the flange of said rim base and the other bead portion adjacent to said movable flange; and
(c) an annular ring-shaped run flat device comprising a rigid radially inner ring and a resilient radially outer ring, said rings comprising a plurality of arcuate sections, each section comprising a radially inner rigid portion having a squared horseshoe-shaped cross section and containing radial reinforcements that are adjacent to the rim base with the open side of said horseshoe-shape facing radially inwardly, the radially inner extremities of each rigid portion being positioned near said rim base but axially spaced apart from the bead portions of said tire, each arcuate section further comprising a radially outer resilient portion having a radially inner surface fastened to a radially outer surface of said rigid portion, the radially inner surface of said resilient portion having the same width as the radially outer surface of said rigid portion, and said run flat device having a height that is 25 to 55 percent of the tire section height while the height of the rigid inner ring is 20 to 80 percent of the height of the run flat device.

2. An assembly according to claim 1 wherein said rim further comprises a plurality of circumferentially spaced apart stops extending radially outwardly from said rim base, one of the radial reinforcements of said run flat device being disposed between said stops to restrict circumferential movement of the run flat device with respect to said rim.

3. An assembly according to claim 2 wherein said radial reinforcements further comprise a hexagon in cross section, having an upper half being substantially rectangular in conforming to the squared horseshoe-shaped cross section of said inner rigid portion and a lower half being substantially trapezoidal, wherein the radially inner extremities of said lower half are smaller than the radially out extremities of the squared horseshoe-shaped inner rigid portion.

4. An assembly according to claim 3 wherein said radial reinforcements are adjacent to the rim base and loosely affixed thereto and capable of slideable axial movement.

5. An assembly according to claim 4 wherein said acruate sections are joined to one another by a fastening means releasably connecting the radial reinforcements of one acruate section to the radial reinforcements of an adjoining arcuate section.

* * * * *